US006269378B1

(12) United States Patent
Quirt (10) Patent No.: US 6,269,378 B1
(45) Date of Patent: Jul. 31, 2001

(54) METHOD AND APPARATUS FOR PROVIDING A NAME SERVICE WITH AN APPARENTLY SYNCHRONOUS INTERFACE

(75) Inventor: Alan Richard Quirt, Kanata (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/219,313

(22) Filed: Dec. 23, 1998

(51) Int. Cl.[7] .................................................. G06F 17/30
(52) U.S. Cl. ..................... 707/103; 707/104; 709/203; 709/213; 364/478.04; 395/702
(58) Field of Search ..................... 702/103, 104; 709/213, 203; 364/478.04; 395/702

(56) References Cited

U.S. PATENT DOCUMENTS

| | | | |
|---|---|---|---|
| 5,581,761 | * 12/1996 | Radia et al. | 395/702 |
| 5,619,710 | * 4/1997 | Travis, Jr. et al. | 709/203 |
| 5,854,750 | * 12/1998 | Phillips et al. | 364/478.04 |
| 5,873,092 | * 2/1999 | Cheng et al. | 707/103 |
| 6,044,379 | * 3/2000 | Callsen | 707/103 |

* cited by examiner

Primary Examiner—Thomas Black
Assistant Examiner—Charles L. Rones (57) ABSTRACT

The invention relates to a software module, more particularly to a Name Service for providing client software objects with the software object reference of other software objects in a software system. Look-up requests to the Name Service are made by the objects as ordinary synchronous procedure calls. If a client requests the software object reference of a software object from the Name Service and that request cannot be satisfied by the tables of the Local Name Service, a fake software object reference is returned to the client. This allows look-up requests to terminate within a given time frame. The fake software object reference actually points back to the Name Service. When the client attempts to send a message to the software object, it does so in an asynchronous fashion. The object saves its current context and relinquishes control of the process thread and waits for a reply to its message. The Local Name Service receives the message and sends an off-node query to attempt to locate the software object reference. When it receives a reply to the query, it returns an error message to the client causing the client to repeat the look-up process. The Local Name Service is now ready to respond to the query and returns to the client the software object reference of the software object sought. This invention allows look-up requests to complete within a time length similar to that of a local look-up, without requiring the entire Name Service table to be stored on every node, and without the complexity of sending an additional asynchronous message to the Name Service before each intended asynchronous message to another object. This invention is particularly useful in the context of asynchronous software systems.

9 Claims, 9 Drawing Sheets

METHOD AND APPARATUS FOR PROVIDING A NAME SERVICE WITH AN APPARENTLY SYNCHRONOUS INTERFACE

FIELD OF THE INVENTION

This invention relates to a program element and a programmed computer system for implementing a function that can locate a software object residing in a distributed computing system. It is particularly applicable to software object-oriented software applications and may be used to provide a Name Service with an apparently synchronous interface in an asynchronous software system. The invention also extends to a method for locating a software object residing in a distributed computing system.

BACKGROUND

It is common to run complex software applications on a distributed computing platform that comprises several machines, herein referred to as nodes, each node running a portion of the applications. The nodes communicate with one another through communication links using ATM or any other suitable communication protocol. Distributed processing is a powerful way to make software scaleable and to allow a single system to have components in multiple locations. Many standards for distributed processing exist and are commonly used. As a specific example, the Common Software Object Request Broker Architecture (CORBA) provides a basic mechanism for transparently distributing software objects across multiple network nodes. CORBA software objects may be written in a variety of programming languages, and may run on a variety of computer processor types. The communication, and any needed translation between the different data formats of varying processor types and programming languages, is handled automatically by CORBA. CORBA is a standard defined by the Object Management Group (OMG) For more information on the CORBA standard the reader is invited to consult "The Essential CORBA: Systems Integration Using Distributed Objects", by Thomas J. Mowbray and Ron Zahavi, Object Management Group Inc, 1998, whose content is hereby incorporated by reference.

There are large numbers of software applications running in distributed networks. Of particular interest here is asynchronous software whose software objects communicate by exchanging independent messages. In a typical asynchronous interaction, one object A may send a message to another object B. Having sent its message, object A may continue processing, or may wait to receive messages. Though object A may expect object B to return a reply message, object A remains responsive to messages from any object in the system. In contrast, in a synchronous distributed software system a request message and its reply are treated as an indivisible whole, equivalent to a procedure call. If an object A communicates synchronously with an object B, a simple implementation of object A remains unresponsive to messages from other sources until it has received a reply from object B. If object A must remain responsive to messages from other sources while waiting for a synchronous interaction to complete, object A must make use of more than one processing thread. The use of multiple threads complicates the design of object A and requires additional system resources.

In a typical asynchronous interaction, a plurality of objects operate using a certain processing thread. The control of the certain thread is given to objects one at the time, typically when a new message is received. When a given object has control of the thread, the object performs its functions. Some of the functions require objects to send messages to other objects in the system. Typically, when a certain object is waiting for an answer to a message, the certain object relinquishes control of the thread in order to allow other messages to be processed either by this certain object or by other objects which share the certain processing thread. This style of operation of objects, which is commonly referred to as asynchronous run-to-completion operation, is commonly used because it makes efficient use of system resources.

In order to refer to individual software objects in a distributed software system, a persistent name is given to each software object. The persistent name allows software objects to communicate with other software objects in the software system irrespective of the software objects' location in the system. To communicate with a software object, the location of that software object in the network must be resolved into an actual software object reference. The software object reference is the software reference of the software object. Amongst other information, the software object reference may comprise information about the node on which the software object is located and other information to help locate the software object in the system. A Name Service unit resolves a software object's persistent name into a software object reference that can be used to communicate with that software object.

The Name Service is an entity which is located at a well-known location in the distributed system and which keeps an entry for visible software objects in the system. Upon initialization, software objects in the software system register with the Name Service by sending their respective persistent name, software object reference, scope of registration and other relevant information to the Name Service in the form of a registration message. Typically, the Name Service can be a simple look-up table with a set of functions or methods to interact with the table. The Name Service tables may be distributed in the system. A particular example of a distributed Name Service includes a Central Name Service table, herein designated as Central Name Service, having entries for each visible software object in the system and subservient Name Service tables containing subsets of these entries. Generally, the subservient Name Services are associated to individual nodes (Local Name Service) or groups of nodes (Cluster Name Service). This particular Name Service structure will be used for the purpose of example through this specification.

When sending a message toward a remote location, a software object queries the Name Service to obtain the software object reference of the message recipient. In a typical interaction, a software object in the system, herein referred to as a client, sends a message to the Name Service requesting the location of another software object. The message contains the persistent name of the software object sought. The Local Name Service upon receipt of the message attempts to locate the software object reference corresponding to the persistent name. If the software object reference is in its local table, the Local Name Service sends a reply message to the client containing the software object reference of the entity sought. Occasionally, the entity sought will not have an entry in the Local Name Service contacted by the client. In this situation, typically the Local Name Service will send a message to an off-node Name Service asking for the software object reference of the software object sought. The off-node Name Service locates the software object reference corresponding to the persistent name and sends an acknowledgement message to the Local Name Service along with the software object reference. The Local Name Service receives the acknowledgement message from the off-node Name Service and sends an acknowledgement containing the software object reference to the client. The total elapsed time for the look-up operation is highly variable and may be very long if the request must be passed to many different off-node components of the Name Service before it is satisfied.

In the above-described process, during the look-up process, the client may behave in one of two fashions. In the first fashion, the client may treat the look up operation in a synchronous fashion and wait for a reply to this message to come. During this time, the processing thread cannot be used to process any other message. If the client uses only one processing thread this results in idle time and delays in the processing operations. If the client uses additional threads in order to remain responsive while waiting for the reply, the client consumes additional memory and processing resources and requires significantly more complex code to co-ordinate the actions of its multiple threads.

A possible solution for reducing delays for off-node synchronous look-up requests is to put complete copies of the Name Service table on every node in the system. This eliminates the need for off-node look-ups thereby providing a substantially reduced delay time for certain look-up requests. However, this option increases substantially the amount of memory required to store the Name Service on each node as well as increases the number of registration messages being sent every time a new software object registers with the system. Finally, the time required for searching the data in the Name Service increases as the size of the Name Service table increases since more entries need to be processed.

In another fashion, the client may treat each look-up with the Name Service as explicitly asynchronous. In a typical interaction, a client sends a message to the Name Service, starts working on other tasks and later receives the look-up result as a normal message on the client's message queue. This approach allows the Name Service to make any number of remote look-ups before eventually returning a result (success or failure) to its client. The disadvantage is that it complicates the programming of clients. The client must explicitly save the context of the query message sent to the Name Service, in such a way that when a reply eventually arrives from the Name Service, it will be possible to resume the interrupted processing. For each message that requires a Name Service look-up (which may be most messages) the client must save its context twice, once for a message to the Name Service and once for the desired message to the external object. This adds significant complexity in the code of the client, reducing the reliability and maintainability of the code.

Thus, there exists a need in the industry to provide an improved method and Name Service for locating a software object in an asynchronous distributed software system with the simplicity of synchronous interaction and a uniform response time comparable to a local Name Service look-up.

OBJECT AND STATEMENT OF THE INVENTION

For the purpose of this specification, the word "node" is used to designate a hardware module capable of network communication. Typically such a module contains a microprocessor which handles communications and which may perform other processing functions.

For the purpose of this specification, the word "software object" is used to designate a collection of related data with an interface that defines the operations available on that data. The software code for the software object is generally written in a programming language appropriate to its functions, such as Smalltalk, C++, Pascal, Java, or Assembler.

For the purpose of this specification, the expression "persistent name" is used to designate the static name of a software entity that external software objects use to communicate with it. The persistent name is typically independent of the location of the software entity in the system. In a specific example, the persistent name of an object is in the form of a character string.

For the purpose of this specification, the expression "software object reference" is used to designate the software location of an instance of a software object in a system. This expression should be given a broad interpretation to include a pointer to an actual object reference, a pointer to a memory location containing a handle referring to a software object reference and other equivalents. Typically, within the object reference is a hardware node address that specifies the network location of the software object. In the preferred embodiment, a Name Service translates the persistent name of a software object into its software object reference. A particular object with a certain persistent name maintains its persistent name irrespective of the instantiation of that object. On the other hand, each instantiation of a certain object is given a different object reference that typically is valid only for that particular instantiation. For example, if a subsystem of a distributed software system is taken out of service then is subsequently restarted on the same node or on some other node, each object in the restarted subsystem keeps the same persistent name that it had formerly, but is given a new object reference.

The present invention is focused toward software object oriented designs and hence this description uses the terminology of this field. The processes and principles described below and in the pages that follow can be applied to function-oriented designs as well without deterring from the spirit of this invention.

In summary, this invention provides a computer readable storage medium including a program element for execution by a computing apparatus to implement a Name Service. The Name Service allows a given software object to locate another software object in the system through the use of a persistent name. The Name Service, that can form a software object itself, includes an interface functional block permitting the Name Service to receive locate request messages conveying persistent names of external software objects and for transmitting responses to the locate request messages conveying software object references corresponding to the persistent names. The Name Service also includes a first data structure for storing data mapping persistent names of software objects to respective software object references, and a second data structure for storing data indicative of unresolved locate request messages.

The Name Service is responsive to a locate request message conveying a certain persistent name to search the first data structure for the persistent name. If the persistent name is not found in the first data structure, an entry is created in the second data structure associated with the persistent name. The Name Service may then return to the external software object that has issued the locate request message an interim result from the locate operation without waiting for completion of any off-node further look-up of the persistent name.

The advantage of the early termination of the searching is that it is always completed within a relatively short bounded time because the processing of a client's locate request takes place entirely locally. This permits the Name Service's client interface for locate requests to be implemented as a synchronous interface, even when the Name Service's clients operate in an asynchronous run-to-completion environment. In specific examples, this synchronous interface may be either a synchronous messaging interface or a simple procedure call interface. In either example, the client's code may consist of a simple synchronous call that does not require an additional processing thread or the explicit saving of message context. At the same time that the client is able to resume processing after receiving an interim result, the Name Service can perform remote searching to translate the persistent name to a suitable software object reference. The advantage of the second data structure is that it maintains a record of unresolved locate requests, so that the Name Service can eventually supply the results of the remote searching to its clients in a transparent fashion.

In a preferred embodiment, the client object queries the Name Service for the object reference of a certain object. If no local entry is found for the object reference of the certain object, the Name Service returns an interim result to the client. If eventually the client uses this interim result to attempt to communicate with the certain object, the client receives an error indication. When the client then queries the Name Service again for the same object reference the Name Service returns the actual object reference of the certain object.

The systems that can make use of the invention may be a single discrete computing apparatus or be of a distributed nature. The most preferred embodiment of this invention uses CORBA software objects (Common Software object Request Broker Architecture). CORBA software objects are part of a standard defined by the Software object Management Group (OMG) and are accessible anywhere in a distributed system as long as their software object reference is exported.

The invention also provides a method for implementing a Name Service.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DESCRIPTION OF A PREFERRED EMBODIMENT

In this specification, the nomenclature used in software object oriented programming has been employed. Expressions such as "message passing", "class", "software object", "inheritance" are well known in the art of software object oriented software design (OOD). For the reader who wishes to consult a reference on the topic of software object oriented design, "The Software object Concept, an introduction to computer programming using C++" by Kick Decker & Stuart Hirsfield PWS publishing Company, Toronto 1995, presents the basics of OOD. The content of the above document is hereby incorporated by reference.

Figure 1A:
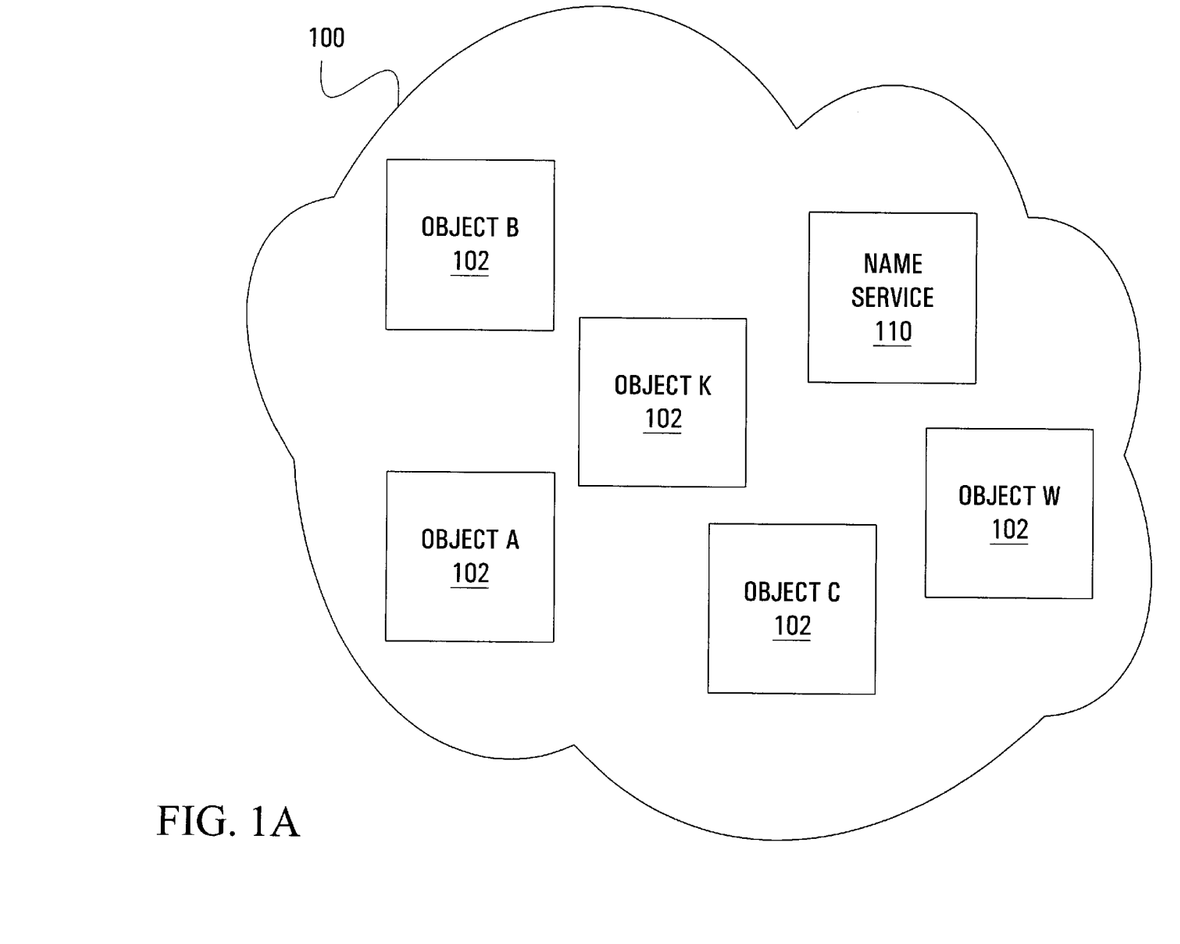
FIG. 1A is a block diagram of a system including an embodiment of the invention.

In the preferred embodiment of this invention, as shown in FIG. 1A, the Name Service 110 is integrated in an object oriented software system 100 comprising a plurality of software objects 102. The software objects 102 perform tasks within the system and may communicate with one other through messages. All the software objects need not reside in the same physical location. The Name Service 110 allows a given software object to locate another software object in the system through the use of a persistent name.

In order to refer to individual software objects in a software system, a persistent name is given to each software object. The persistent name allows software objects to locate other software objects in the software system. This allows software objects to communicate one another irrespective of the relative locations of the software objects in the system. To communicate with a software object, the location of that software object in the network must be resolved into a software object reference. Amongst other information, the software object reference may comprise information about the node on which the software object is located or other information to help locate the software object in the system.

A Name Service unit is normally provided in the system to resolve a software object's persistent name into a software object reference that can be used to communicate with that software object.

Figure 1B:
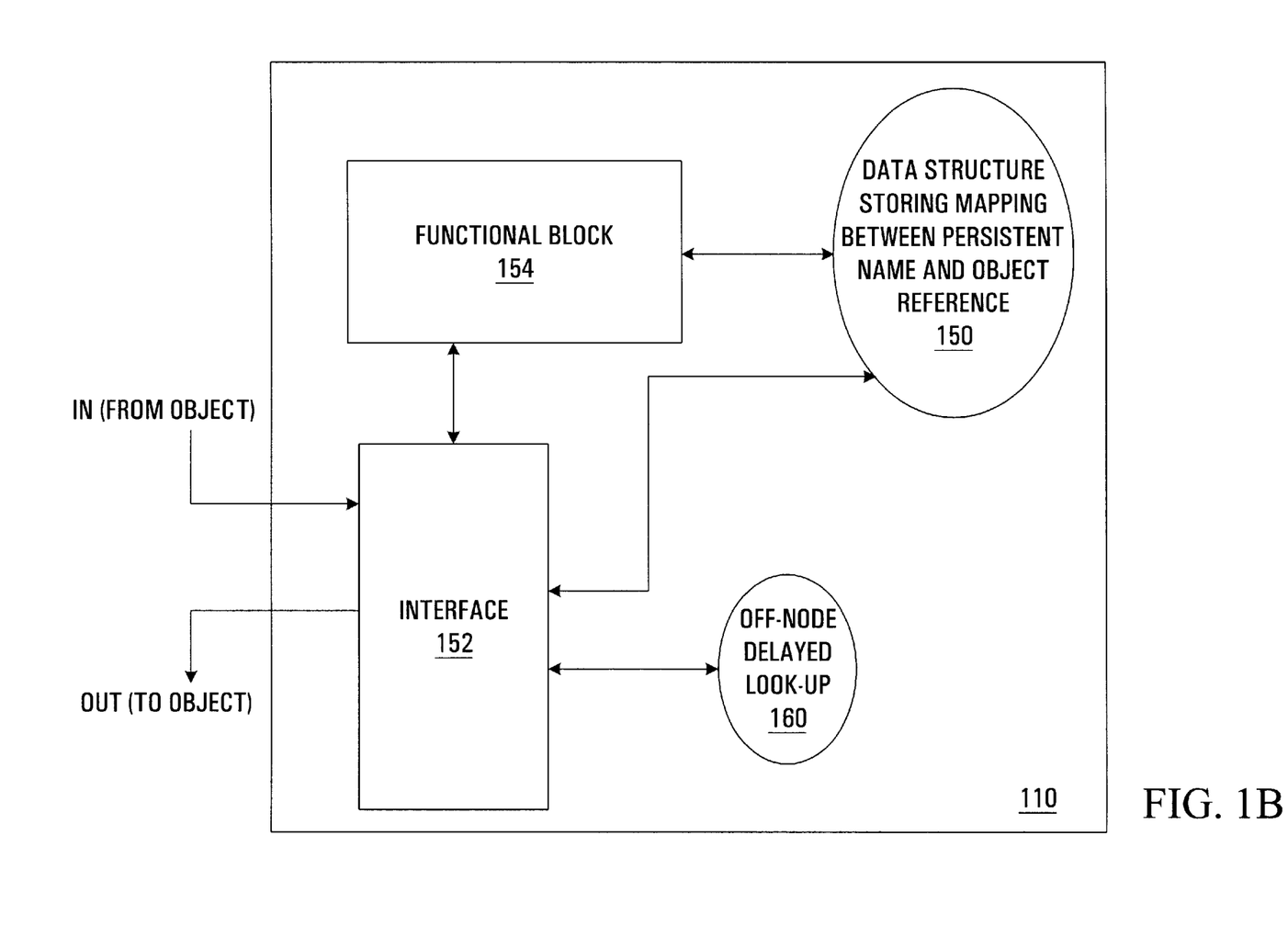
FIG. 1B is a block diagram of an embodiment of the Name Service in accordance with the invention.

The Name Service 110 is an entity which is placed at a well-known location in the distributed system and which keeps entries for every visible software object in the system. In a preferred embodiment, as shown in FIG. 1B, the Name Service 110 includes a data structure 150 for storing entries corresponding to software objects in the system, an interface 152 for communicating with the software objects in the system and a functional block 154 to manipulate the data structure 150. The interface is capable of managing the reception and the dispatching of messages. Any suitable interface design may be used without detracting from the spirit of the invention.

The Name Service further includes a second data structure 160, herein designated as off-node delayed look-up structure, including entries for certain persistent names which have been requested by clients but which were not found in the data structure 150. Additional information is associated with each name to allow correct response both to messages which clients may attempt to send to objects having those certain persistent names, and to messages containing the results of off-node look-ups of those certain persistent names.

In a specific example, the data structure 150 can be a simple look-up table and the functional block 154 contains a set of functions or methods to interact with the table. These interactions may be the entry of a record in the table, the deletion of a record in the table, the modification of a record in the table, etc. A specific example of a portion of such a table 150 is shown below.

| Entry # | Persistent Name | | Software object Reference |
|---|---|---|---|
| 1 | USER | 555-0000; | A452C67 |
| 2 | USER | 555-0000; | B56345E |
| ... | ... | ... | ... |
| K | TERMINAL | V01; | AFE5270 |
| K + 1 | TERMINAL | V50; | BF35516 |

The delayed look-up data structure 160 holds the information mapping persistent software object names with corresponding object references that are not found in the local table in the data structure 150. The structure of the delayed look-up table will be described in detail later.

Figure 2A:
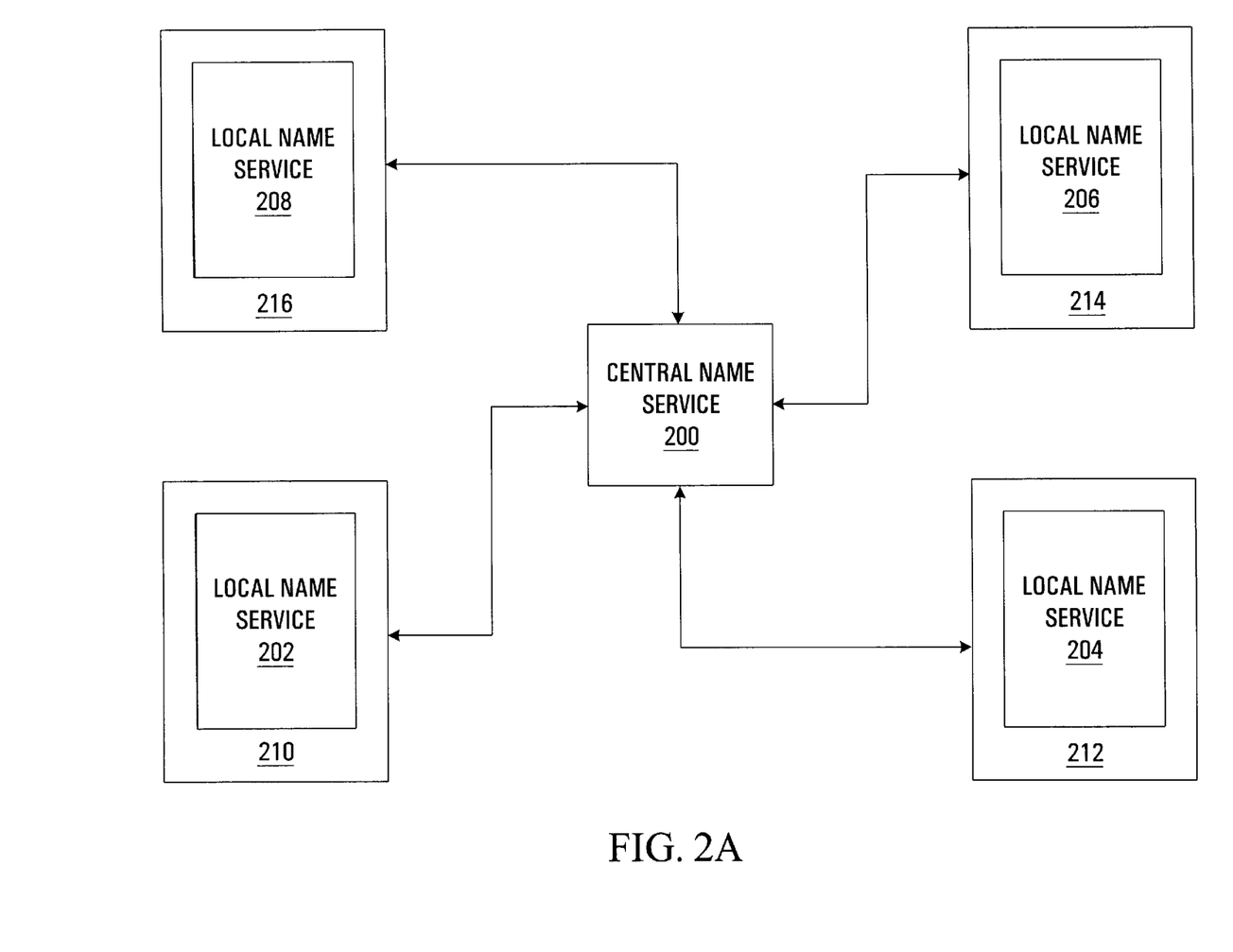
FIGS. 2A and 2B are functional block diagrams of different embodiments of a distributed Name Service in accordance with the invention.

In a preferred embodiment, the Name Service 110 is implemented in a distributed computing system comprising a plurality of nodes. These nodes may be grouped into sets, herein referred to as clusters. In a specific example, as shown in FIG. 2A that is a functional block diagram of a distributed Name Service, the latter is comprised of a Central Name Service 200 and a set of Local Name Services 202, 204, 206 and 208. The Central Name Service 200 includes an entry for each visible software object in the distributed system. The Local Name Services 202, 204, 206 and 208 are associated to individual nodes 210, 212, 214 and 216 and include entries for the visible software objects within their respective nodes and optionally a few selected entries from other nodes. In other words, there is one Local Name Service for each node that may reside on the node or remotely from the node. More specifically, each Local Name Service 202, 204, 206 and 208 is identical to the diagram illustrated in FIG. 1B. In other words the Local Name Service includes the data structure 150, the interface 152, the functional block 154 and the Off-node delayed look-up data structure 160. As to the Central Name Service 200, it is identical to what is depicted in FIG. 1B, except that it does not have the Off-node delayed look-up data structure. This is so because the data structure 150 contains all the references to all the software objects in the system and no delayed look-up is needed nor is it possible.

Figure 2B:
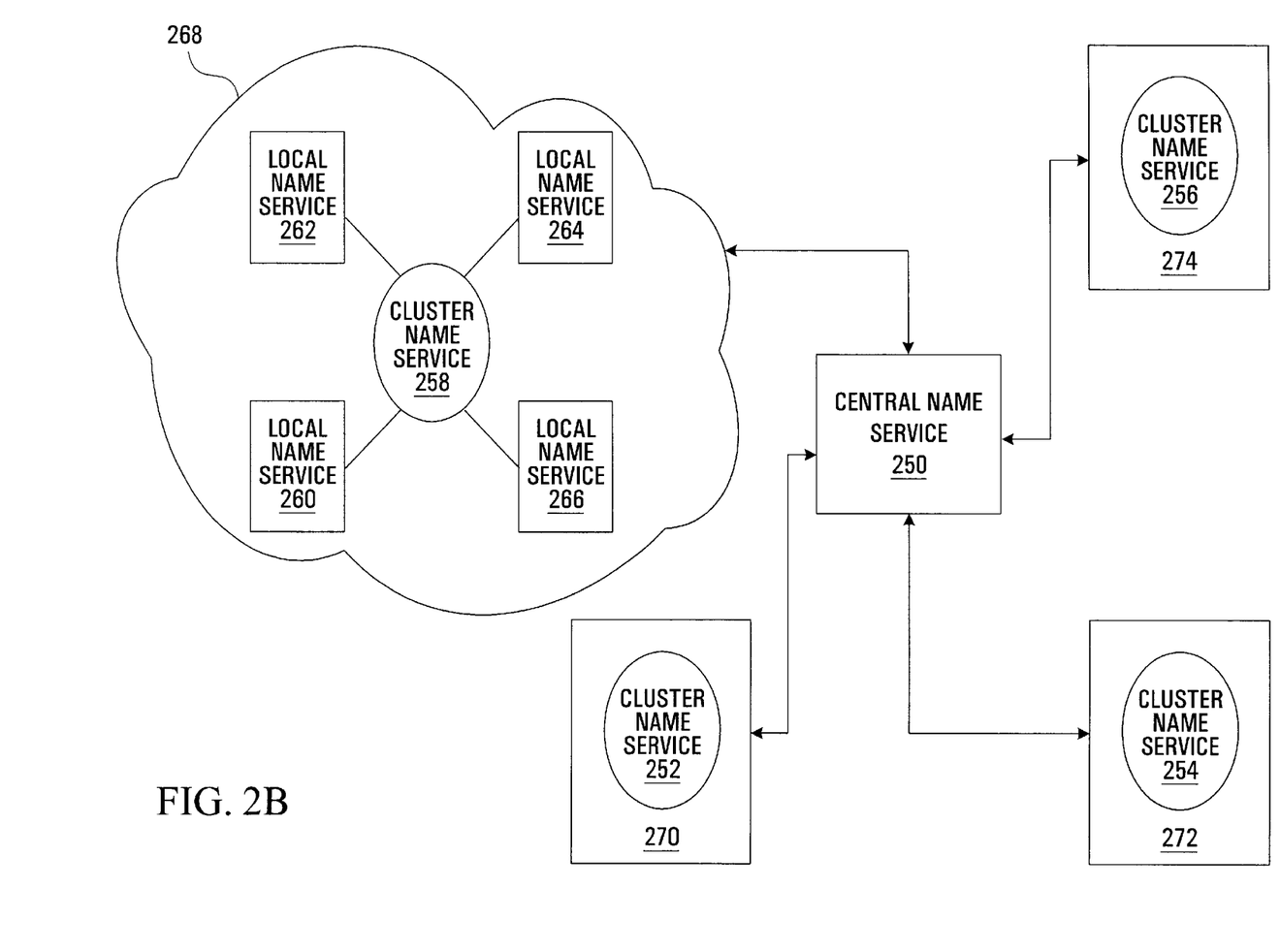

In another possible embodiment, as shown in FIG. 2B, the Name Service is comprised of a Central Name Service 250, a set of Cluster Name Services 252, 254, 256 and 258 and a set of Local Name Services 260, 262, 264 and 266. The major difference with the architecture depicted at FIG. 2A is the introduction of an intermediate entity, the Cluster Name Service, between the Local Name Services, and the Central Name Service. This Name Service architecture, herein referred to as a hierarchical Name Service, is best suited for large network domains, where automatic reference to the Central Name Service, when the Local Name Service cannot resolve an object reference, is not always desirable. Thus, if a Local Name Service cannot resolve an object reference, it refers the matter first to the Cluster Name Service and only then, if resolution is not possible, the Central Name Service is invoked. FIGS. 2A and 2B illustrate examples of hierarchical name services differing in the number of levels of the hierarchy. Other Name Service architectures may be used without departing from the spirit of the invention. This invention can be used with any distributed name service including one which in which local Name Services communicate directly with each other, with or without the help of higher level Name Services.

The Central Name Service 250 includes an entry for each visible software object in the distributed system. The Cluster Name Services 252, 254, 256 and 258 are associated to clusters 270, 272, 274 and 268 and are located on one of the nodes in the cluster and contain entries for software objects in their respective cluster and optionally a few selected entries from other clusters. The Local Name Services 260, 262, 264 and 266 are associated to individual nodes and include entries for the software objects within their respective nodes. Optionally, local Name Services may contain entries for software objects residing on other nodes. The Local Name Services 262, 264, 260 and 266 and the Cluster Name Services 252, 254, 256 and 258 are identical to the structure shown in FIG. 1a, except that the contents of the data structures 150 and 160 change from one Name Service to another. As to the Central Name Service 250 it is identical to the structure of FIG. 1B, except that the data structure 160 is not present.

Software objects operating in a software system making use of this invention register their software object references and persistent names with the Name Service. Upon initialization, each software object in the software system registers with the Name Service by sending its persistent Name, software object reference and other relevant information to the Name Service in the form of a registration message. Optionally, the registration message also includes a parameter identifying the scope of registration of its reference. This parameter may indicate if the software object reference must be registered on every node in a given cluster or every node in the system.

For the purposes of this specification the communication between the client and the Name Service need not be by explicit messages and may be by conventional synchronous procedure call, which in object-oriented languages such as C++ or Smalltalk is often referred to as sending a message to the called object.

Figure 3:
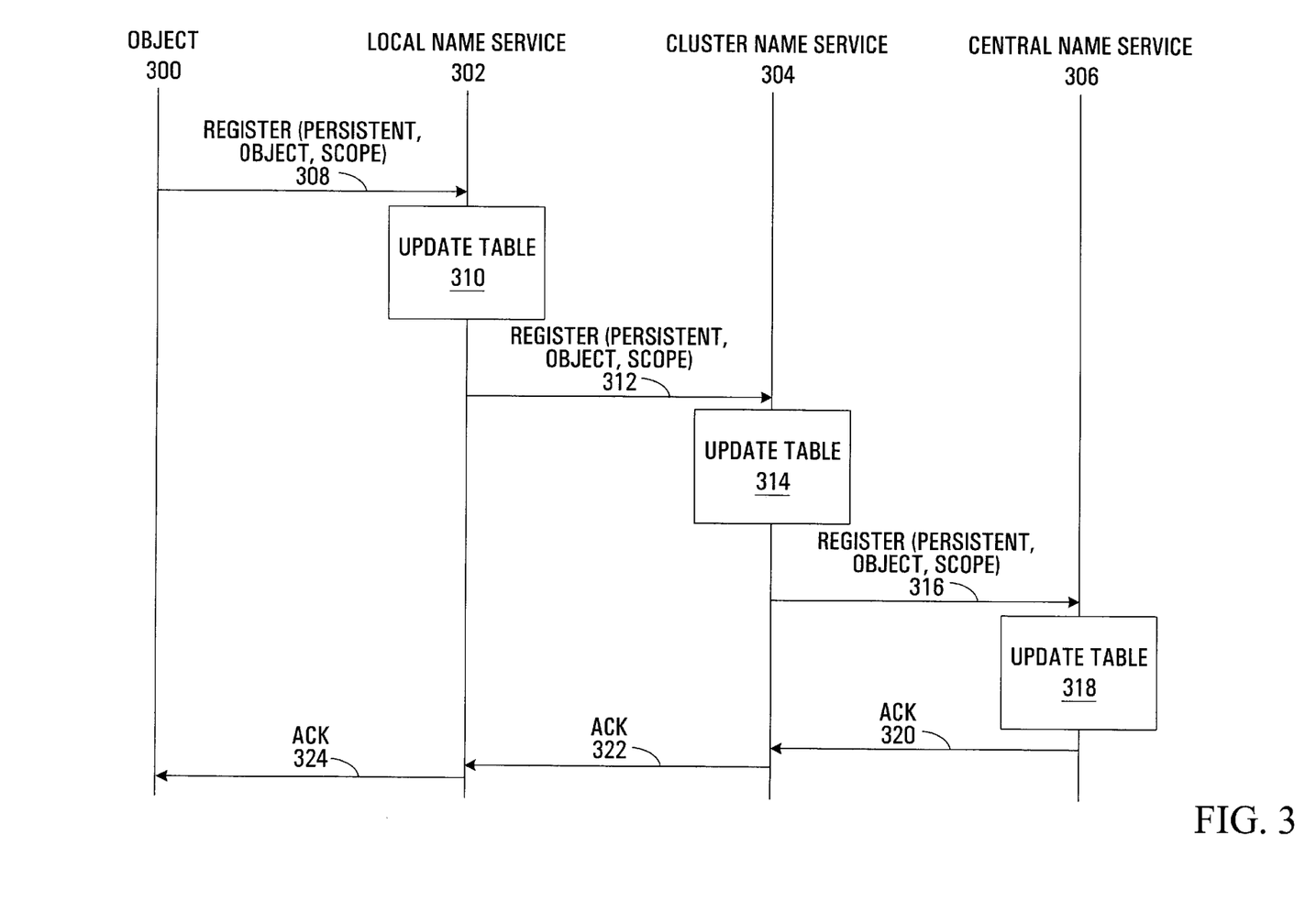
FIG. 3 is a flow diagram of the registration procedure of a software object with the Name Service in accordance with the invention.

The following example illustrates the registration process. As shown in FIG. 3, a software object 300 sends a registration message 308 to the Name Service requesting that a registration be made. The registration message 308 includes a scope parameter indicating that the registration is to be performed at a central level (in the Central Name Service, in the Local Name Service 302 and in the associated Cluster Name Service). The Local Name Service 302 receives the request and creates an entry 310 in its data structure. The Local Name Service 302 then sends a message 312 its associated Cluster Name Service 304 requesting that the software object reference be registered. The Cluster Name Service 304 creates the same entry 314 in its table and sends a message 316 to the Central Name Service 306 requesting that the software object reference be registered. The Central Name Service 306 again creates an entry 318 in its table and sends an acknowledgement message 320 to the Cluster Name Service 304. The Cluster Name Service 304 receives the message and sends acknowledgement message 322 the Local Name Service 302. The Local Name Service 302 then sends an acknowledgement message 324 to the software object 300 indicating that the registration was successful.

Figure 4:
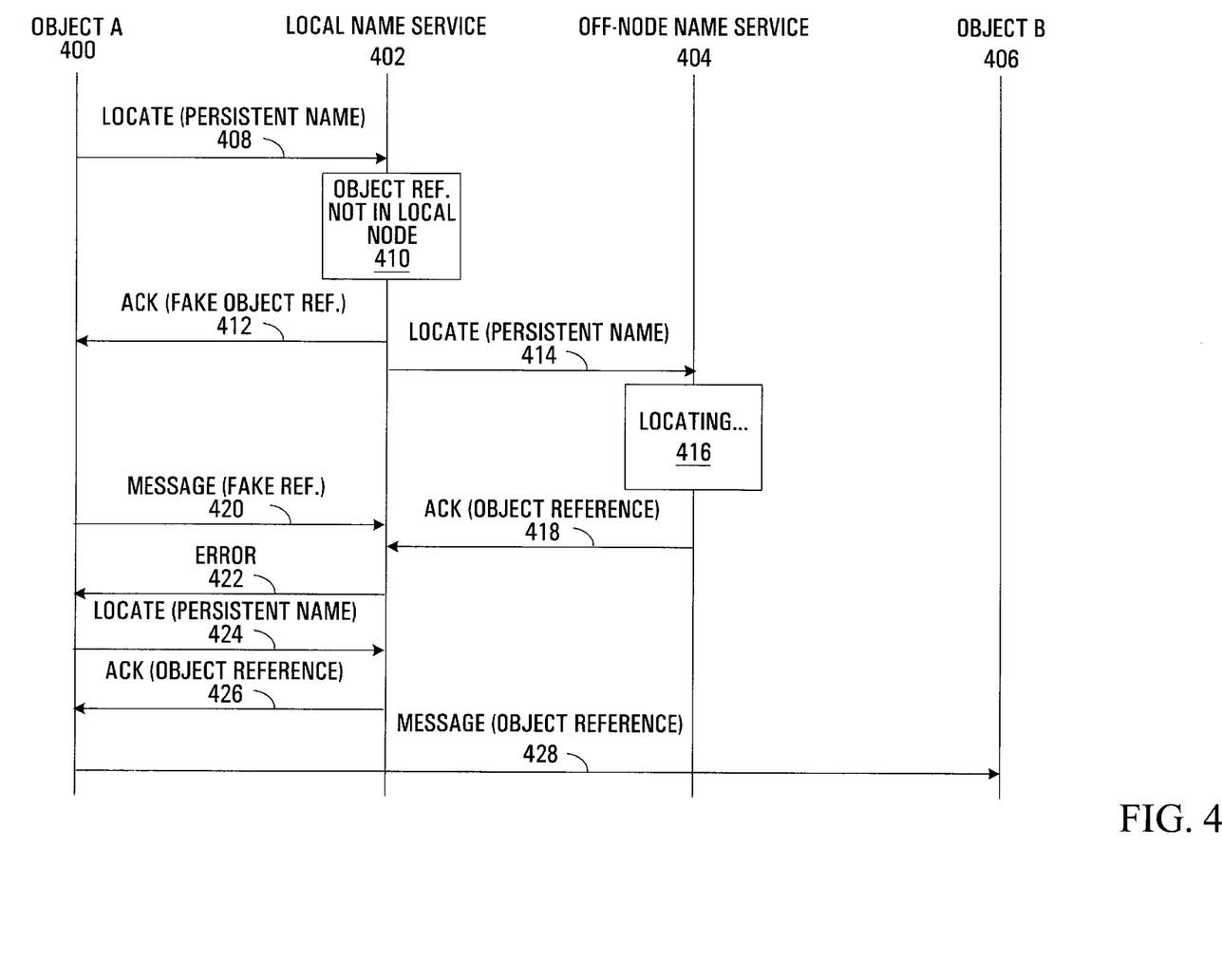
FIG. 4 is a flow diagram of a look-up operation involving the Name Service in accordance with the invention.

Once a software object is registered, it may communicate with other software objects in the system using the Name Service. Before sending a message, unless it has previously looked up the object reference of this object, a software object queries the Name Service to obtain the software object reference of the entity. In a typical interaction, as shown in FIG. 4, Software object A 400 sends a message 408 to the Name Service requesting the software object reference of another software object, Software object B 406. The message 408 contains the persistent name of Software object B. During the time the Local Name Service 402 is searching for the object reference, the object 400 maintains control of its thread as in an ordinary synchronous procedure call. The interface of the Local Name Service 402 may be offered ordinary synchronous procedure calls as well as or instead of through synchronous messages.

The Local Name Service 402 receives the message 408. The message reception is handled by the interface 152. Afterwards, the functional block 154 is invoked to search the data structure 150 to locate the software object reference corresponding to the persistent name. If an entry corresponding to the persistent name is found, the Local Name Service, through interaction between the functional block 154 and the interface 152 sends a reply message to software object A 400 including the software object reference of software object B 406 and the look-up procedure is complete.

If no entry is found corresponding to the persistent name, the logic in the functional block 154 invokes an off-node delayed look-up procedure. In short, this procedure invokes the services of an off-node Name Service to resolve the object reference. The off-node look-up may be in a peer Local Name Service or may be a Name Service upward in a hierarchy depending on the organization of the Name Service. In the specific example of a hierarchical Name Service, the off-node look-up is made to the Name Service one step up in the hierarchy. In a specific example, the Local Name Service 402 sends a request to locate message 414 to an off-node Name Service 404. In a specific embodiment, the Off-node Name Service is the Central Name Service. While the Local Name Service 402 awaits a response from the Central Name Service, it also sends an acknowledgement message 412 to software object A 400. The main purpose of this acknowledgement message is to break the transaction with the object and thus avoid the object remaining blocked (not releasing the shared execution thread) while the chain of Name Services is trying to resolve the object reference.

The acknowledgement message sent to the software object A 400 contains an object reference as usual. The software object A 400 perceives the acknowledgement message as a valid response to its original query. In other words, object reference in the message is perceived to be a reference to the object originally sought, but in reality it is a reference to the Local Name Service 402. This object reference, which is referred to below as a fake object reference, is a real object reference of the Name Service 402 but is not a true object reference of the software object B 406. The software object A 400 then attempts to communicate with the software object B 406. The object of the communication may be to instruct the software object B 406 to perform a certain task. The message sent by the software object A 400 includes the normal data/instructions part of the intended transaction with the software object B 406 including an address part that is the reference to the Local Name Service. Once the object 400 sends its message 520, it saves its current context and relinquishes control of the process thread. The object 400 then waits for a reply message.

The message sent by the software object A 400 never reaches the software object B 406 and is directed instead to the Name Service 402. The Name Service 402 maintains in the data structure 160 a list of all the off-node delayed look-up requests 414. Preferably, for each off-node request, the fake software object reference, the persistent name of the software object sought and the client reference are stored. Since many off-node requests may exist in the data structure 160, preferably each fake reference is made unique in that it acts as a valid object reference of the Name Service in the network domain and also contains additional information such as a table index to let the Name Service 402 more efficiently locate a specific entry in the data structure 160. In a specific example the off-node delayed look-up structure is a table. The table below shows an illustration of a portion of the table.

| Fake Reference | Persistent Name of software object sought | Client Reference | Actual Software object reference |
|---|---|---|---|
| 9999901 | USER; 555-0000; | AFE5270 | C4281AF |
| 9999902 | TERMINAL; V45; | BF35516 | — |
| 9999903 | SERVER; 893; | CFA6753 | — |
| ... | | | |

When the Local Name Service 402 receives the message from the software object A 400 containing the fake reference, the Local Name Service checks whether the off-node Name Service 404 has responded to the off-node request. If no response has been received, the Local Name Service saves the message 520 as information associated with the appropriate entry in data structure 160. The off-node Name Service 404 performs its search operation 416. At some point, the off-node Name Service 404 sends back to the Local Name Service 402 message 418 with the reference to the software object B 406. In a specific example, in order to properly associate the response 418 with message 414, and with the corresponding entry in data structure 160, the local Name Service 402 uses as its own identity in the locate message 414 the same fake object reference that it issued in the acknowledgement message 412 sent to the software object A 400. The Local Name Service 402 updates the corresponding record in its data structure 160. It may optionally also update its primary data structure 150 to contain this same persistent name and object reference for object B 406. The Local Name Service 402 is now able to provide an immediate valid response to a future query for look-up of the formerly missing persistent name of B 406. It is also now able to complete its handling of the message 520. To do this, the Local Name Service 402 sends an error message 422 to object A 400, with an error code indicating that the object reference used in message 420 is an obsolete or invalid object reference. The message 422 is received in the regular message queue of object A. Object A is given control of the process thread and receives the message 422. The error message 422 causes Software object A 400 to restart the procedure of invoking the Local Name Service 402 to effect the object reference resolution. In other words, the software object A 400 will build and send a new locate message 424.

In a specific example, if the software objects in the system are implemented using certain common implementations of a standard such as CORBA, the repetition of a request to locate is the normal response to certain error messages. In cases where a server is replaced, either because of failure or deliberate software upgrade, its clients must be prepared to look-up the new software object reference of the replacement and resend the message that failed to be delivered. The Name Service in accordance with the spirit of the invention takes advantage of this existing exception-handling code in clients, and uses it to hide the delay involved when a look-up cannot be completed using only local information.

In a preferred embodiment, software object A 400 sends a request to locate message 424 to the Name Service 402. The Local Name Service 402 receives the message 424 and is now ready to respond to the query. The Local Name Service sends back an acknowledgement message 426 containing the correct software object reference. At that time the record in the data structure 160 may be deleted, particularly if the persistent name and object reference of object B 406 have been recorded in the data structure 150. Software object A 400 then sends its message 428 to software object B 406 using the software object reference it received from the Local Name Services.

Figure 7:
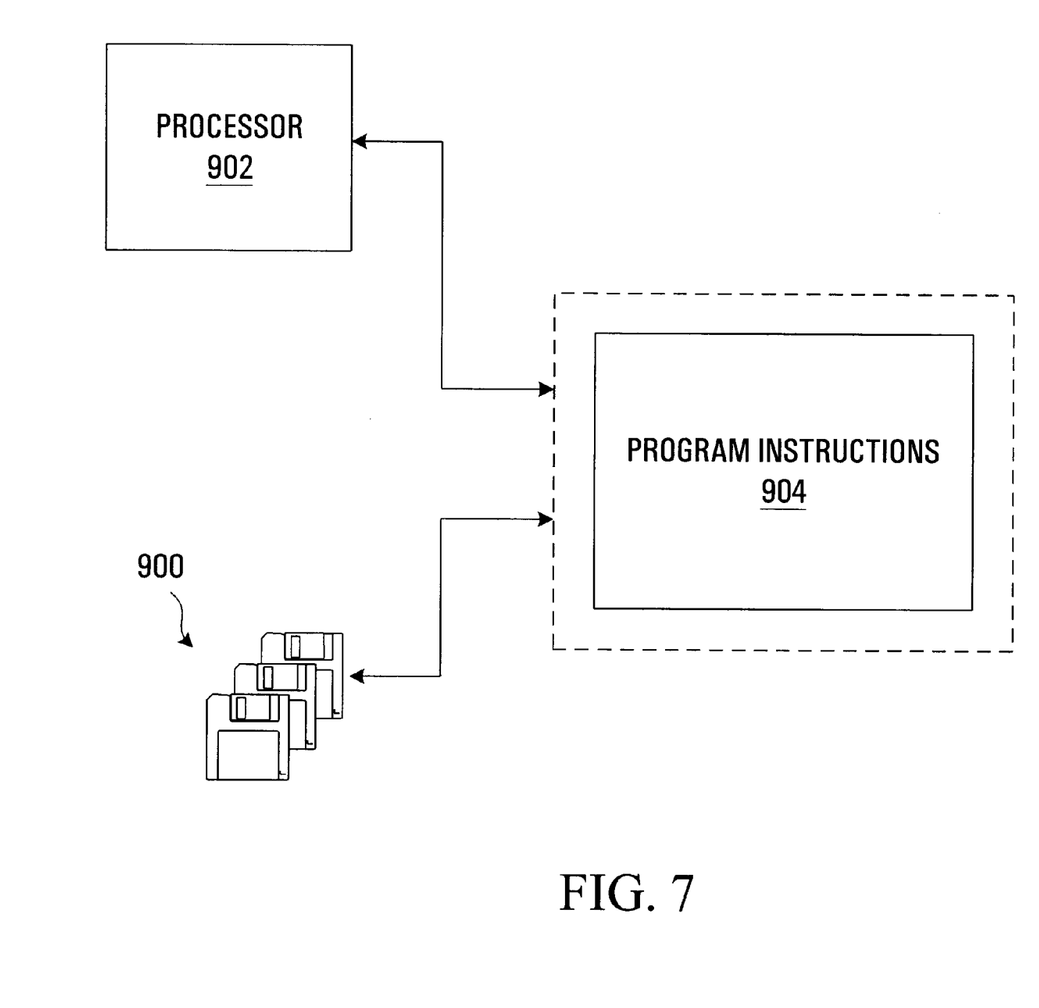
FIG. 7 is a structural diagram of computing apparatus on which a Name Service function in accordance with the invention can be implemented.

In another embodiment, the Name Service waits for the client software object to send a message using the fake software object reference before performing an off-node look-up In a preferred embodiment, as shown in FIG. 7, the Name Service is implemented using a suitable programming language. In a specific example, the Name Service is implemented using C++ with CORBA interfaces, and is run on a Unix or Vxworks platform. The Name Service in accordance with the spirit of the invention may run on any suitable computing platform that constitutes a node of the network. As shown in FIG. 7 such computing platform typically include a processor 902 in operative relationship with a memory 904 containing program instructions implementing the module described in this specification. The computer program 904 may be stored on any suitable computer readable medium 900.

Figure 5:
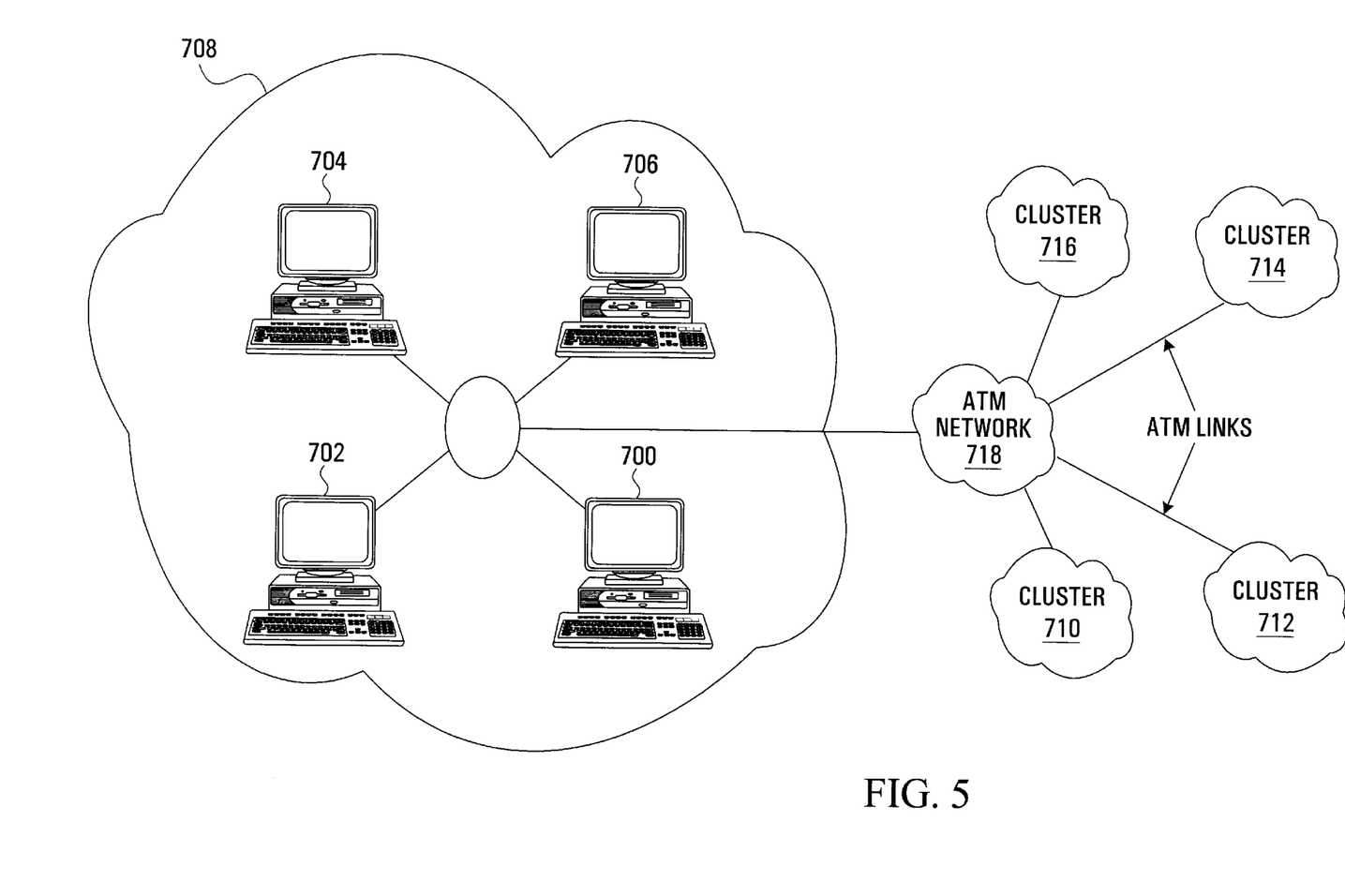
FIG. 5 is a distributed computing network where the novel Name Service can be implemented.
Figure 6:
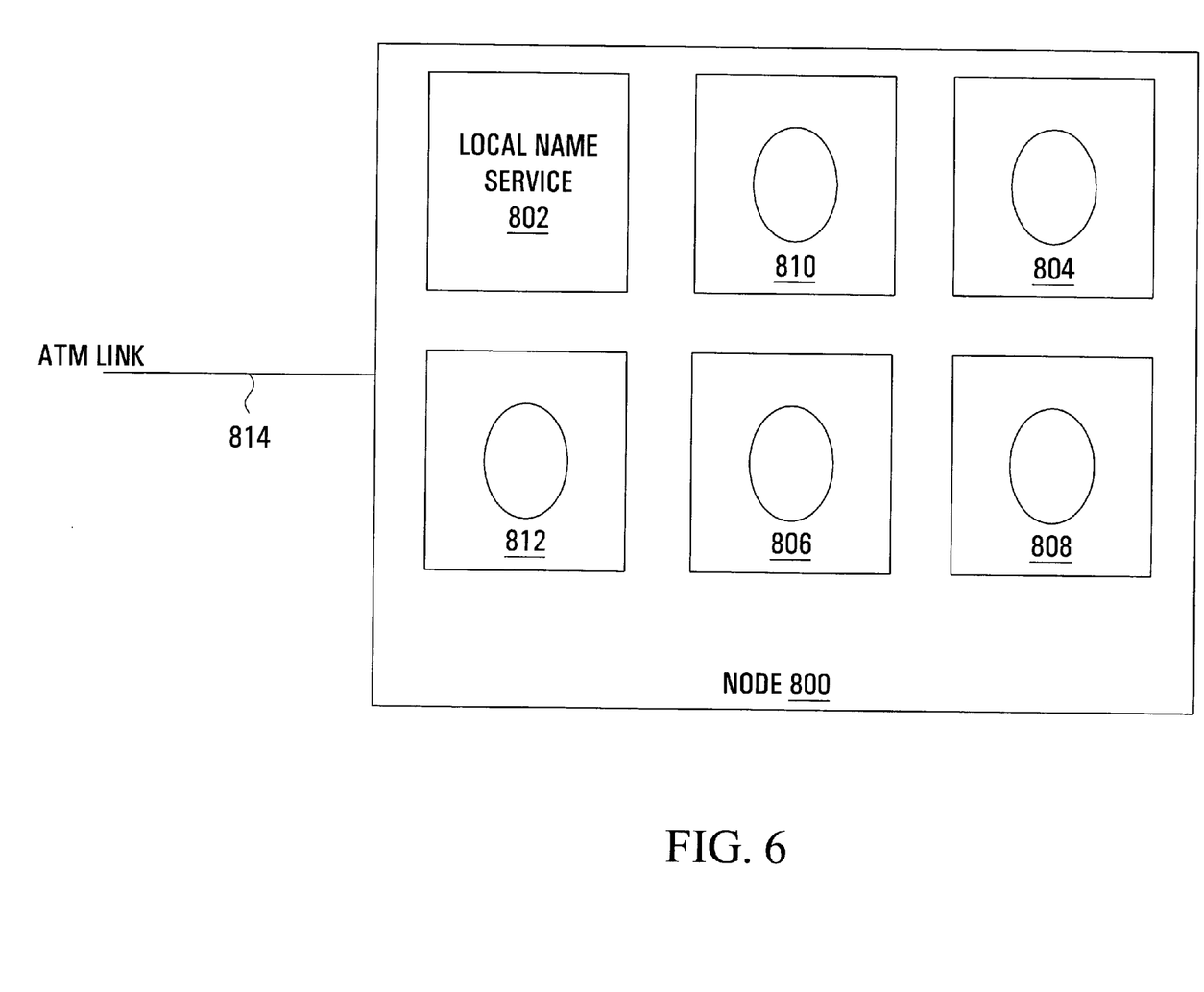
FIG. 6 is a high-level structural block diagram of an apparatus implementing the function of a Name Service in accordance with the invention.

The systems that can make use of the invention may be a single discrete computing apparatus or be of a distributed nature. In a distributed system, as shown in FIG. 5, different parts of a software application run on different computing machines that are interconnected to form a network. These physical machines, herein designated as nodes 700 702 704 706, may reside in geographically remote locations, and communicate using a set of predefined protocols. The software objects and software modules described in this specification operate on these nodes. FIG. 6, shows in block form a node 800 containing software objects 804 806 808 810 812. The node also contains the Name Service or a Local Name service 802. The software objects 804 806 808 810 812 may communicate with each other or with software object in other nodes through the ATM link 814 using the look-up services provided by the Name Service in accordance with the described invention. The set of nodes 700 702 704 706 are grouped into a cluster 708. A cluster is a group of nodes that are able to communicate with one another and the world outside the cluster. A set of clusters 708 710 712 714 and 716 are in turn interconnected through an ATM network 718. The ATM network 718 may be a private or public network. Protocols such as TCP/IP, client/server architecture and message passing are all possible methods of achieving communication between software objects in a distributed computing environment. In addition to these communication protocols a standard communication interface is used, such as those defined by the Object Management Group (OMG,) to allow access to the various software objects in the system. For more information on distributed processing, the reader is invited to consult Operating Systems by William Stallings, Prentice Hall $2^{nd}$ edition 1995, whose content is hereby incorporated by reference. The preferred embodiment of this invention uses the C++ programming language with a CORBA (Common Software object Request Broker Architecture) interface. Other programming languages may be used in the context of the present invention and the use of such a language does not deter from the spirit of this invention.

Although the present invention has been described in considerable detail with reference to certain preferred versions thereof, other versions are possible. Therefore, the spirit and scope of the appended claims should not be limited to the description of the preferred versions contained herein.

I claim:

1. A computer readable storage medium including a program element for processing by a computing apparatus including a processor and a memory for implementing a name service to resolve persistent names of software objects into respective software object references, said name service including:

an interface functional block permitting said name service to receive locate request messages, said locate request messages conveying persistent names of external software objects;

a first data structure for storing data elements mapping persistent names of software objects to respective software object references;

a second data structure for storing data indicative of unresolved locate request messages;

a processing functional block in an operative relationship with said interface functional block, with said first data structure and with said second data structure, said processing functional block being responsive to a locate request message received from a certain client object by said interface and conveying a certain persistent name to:

a. search said first data structure for the certain persistent name;

b. create an entry in said second data structure associated with the certain persistent name if the certain persistent name is not found in said first data structure.

2. A computer readable storage medium as defined in claim 1, wherein when said processing functional block creates an entry in said second data structure, said processing functional block being operative to:

a. generate a fake object reference associated to the entry in said second data structure, said fake object reference being indicative of an address of said name service;

b. cause said interface to generate and to send to the certain client object a response message to the locate request message indicative of the fake object reference.

3. A computer readable storage medium as defined in claim 2, wherein when said processing functional block creates an entry in said second data structure, said processing functional block being operative to:

generate an off-node locate request message corresponding to the certain persistent name;

causing said interface to send said off-node locate request message to a remote name service entity, said external name service entity potentially containing the object reference corresponding to the certain persistent name.

4. A computer readable storage medium as defined in claim 3, wherein said processing functional block is responsive to reception of an off-node message constituting a response to the off-node request message and conveying the actual object reference corresponding to the certain persistent name, to associate the actual object reference with the entry of said second data structure, whereby a reception of a subsequent locate request message received from the certain client object causes said interface to send to the certain client object a response message to the locate request message indicative of the actual object reference.

5. A method as defined in claim 4, further comprising the steps of:
   generating an off-node locate request message corresponding to the certain persistent name;
   sending said off-node locate request message to a remote name service entity, the remote name service entity potentially containing the object reference corresponding to the certain persistent name.

6. A method as defined in claim 5, further comprising the step of receiving an off-node message constituting a response to the off-node request message and conveying the actual object reference corresponding to the certain persistent name, to associate the actual object reference with the entry of said second data structure, whereby a reception of a subsequent locate request message received from the certain client object causes said interface to send to the certain client object a response message to the locate request message indicative of the actual object reference.

7. A method for resolving a persistent name of a software object into an object reference, said method comprising the steps of:
   providing a first data structure for storing data elements mapping persistent names of software objects to respective software object references;
   receiving a locate request message from a client object, said locate request message conveying the persistent name of a certain external software object;
   searching said first data structure for a data element corresponding to said certain persistent name;
   generating a fake object reference if the certain persistent name is not found in said first data structure, said fake object reference being indicative of an address of said name service;
   storing said fake object reference in association with the certain persistent name in a second data structure;
   sending to the client object a response message to the locate request message indicative of the fake object reference.

8. A computer readable storage medium including a program element for processing by a computing apparatus including a processor and a memory for implementing a name service to resolve persistent names of software objects into respective software object references, said name service including:
   interface means for receiving locate request messages, said locate request messages conveying persistent names of external software objects;
   a first data structure means for storing data elements mapping persistent names of software objects to respective software object references;
   a second data structure means for storing data indicative of unresolved locate request messages;
   a processing means in an operative relationship with said interface functional block, with said first data structure and with said second data structure, said processing means being responsive to a locate request message received from a certain client object by said interface and conveying a certain persistent name to;
   a. search said first data structure for the certain persistent name;
   b. create an entry in said second data structure associated with the certain persistent name if the certain persistent name is not found in said first data structure.

9. A computer readable storage medium including a program element for processing by a computing apparatus including a processor and a memory for implementing a name service to resolve persistent names of software objects into respective software object references, said name service including:
   a first data structure for storing data elements mapping persistent names of software objects to respective software object references;
   a processing functional block in an operative relationship with said first data structure and with said second data structure, said processing functional block being responsive to a locate request message received from a certain client object by said interface and conveying a certain persistent name to:
   a. search said first data structure for the certain persistent name;
   b. if the certain persistent name is not found in said first data structure, create and issue to the certain client object a message causing the certain client to issue a message other than a locate request message to said name service.

* * * * *